United States Patent Office 3,351,594
Patented Nov. 7, 1967

3,351,594
PHTHALOCYANINE DYESTUFFS
Peter Frederick Clark and Victor David Poole, Manchester, England, assignors to Imperial Chemical Industries Limited, London, England, a corporation of Great Britain
No Drawing. Filed Apr. 1, 1965, Ser. No. 444,782
Claims priority, application Great Britain, Nov. 25, 1964, 47,976/64; Mar. 15, 1965, 10,770/65
1 Claim. (Cl. 260—242)

This invention relates to new phthalocyanine dyestuffs and more particularly it relates to new water-soluble phthalocyanine reactive dyestuffs which are valuable for colouring cellulose textile materials.

According to the invention there are provided phthalocyanine dyestuffs which, in the form of the free acids, are represented by the formula:

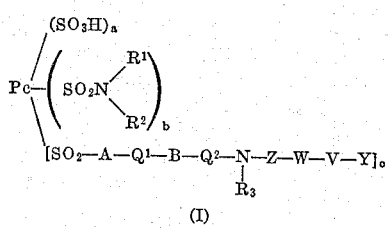

(I)

wherein:

Pc represents a phthalocyanine radical;
$R^1$ and $R^3$ each represents a hydrogen atom or a lower alkyl or hydroxy lower alkyl radical;
$R^2$ represents a hydrogen atom or a lower alkyl, hydroxy-lower alkyl or sulphoethyl radical;
$Q^1$ and $Q^2$ represents s-triazine or pyrimidine nuclei at least one of which contains an atom or group capable of reacting with hydroxyl groups of cellulose in one of the 2, 4 and 6 positions of the nucleus;
A and B represent aliphatic or aromatic diamine or piperazyl radical connected by their nitrogen atoms to the $SO^2$ group and to carbon atoms in the remaining 2, 4 or 6 position of $Q^1$ and $Q^2$;
Z represents an arylene radical which may be substituted;
—W represents —$SO_2NH$, —CO, —CONH, —O or —S;
V represents an alkylene radical which may be substituted or which may contain hetero atoms;
Y represents a chlorine or bromine atom or a —$OSO_3H$ group;
$a$ represents a value of from 1 to 3; and
$b$ represents a value of from 0 to 2 and $c$ represents a value of from 1 to 3, provided that the sum of $a$, $b$ and $c$ does not exceed 4.

The third substituent on the nitrogen atom in A and B when these symbols represent the residues of aliphatic or aromatic diamines can be lower alkyl radicals such as methyl, ethyl, propyl and butyl radicals or hydroxy lower alkyl radicals such as β-hydroxyethyl, β-hydroxypropyl, γ-hydroxypropyl and β:γ-hydroxypropyl radicals. The term "lower alkyl radical" is used to denote the alkyl radicals of low molecular weight, preferably alkyl radicals containing from 1 to 4 carbon atoms.

As examples of alkylene or substituted alkylene radicals represented by V there may be mentioned substituted or unsubstituted alkylene radicals containing from 1 to 6 carbon atoms such as trimethylene, propylene, β-hydroxytrimethylene, β-chlorotrimethylene, β:γ-dimethyltrimethylene and preferably ethylene radicals.

As examples of arylene or substituted arylene radicals represented by Z there may be mentioned 1:3- and 1:4-phenylene radicals which may contain substituents such as chlorine atoms, methyl, methoxy, or sulphonic acid groups.

As examples of the alkylene radicals represented by V which contain hetero atoms there may be mentioned —$CH_2CH_2OCH_2CH_2$—, —$CH_2CH_2SCH_2CH_2$—, and $CH_2CH_2NRCH_2CH_2$— (where R represents a hydrogen atom or lower alkyl group).

As examples of the atoms or groups present in at least one of $Q^1$ and $Q^2$, and capable of reacting with hydroxyl groups of cellulose there may be mentioned chlorine or bromine atoms, thiocyano groups, N,N-disubstituted dithiocarbamate group, heterocyclic mercapto groups, thioamide groups, —$SO_3Na$ or —$SO_3K$ groups and quaternary ammonium groups of the formula:

wherein $T^1$ and $T^2$ each represent methyl radicals and $T^3$ represents a substituted or unsubstituted alkyl or aryl radical or at least two of $T^1$, $T^2$ and $T^3$ are joined together to form with the nitrogen atom a heterocyclic ring or rings wherein the nitrogen atom is attached to carbon atoms in the heterocyclic ring or rings through single bonds or through a single bond and a double bond. The other nucleus represented by $Q^1$ and $Q^2$ can also contain groups of the kind just mentioned or alternatively it can contain groups not capable of reacting with the hydroxyl of cellulose, e.g. hydroxyl, amino or substituted amino groups. Where $Q^1$ and/or $Q^2$ represents a pyrimidyl nucleus, it is frequently found necessary in order to obtain the requisite reactivity of the atom or group in the 2, 4 or 6 position, to have a substituent of electronegative character on the 5-position, e.g. a chlorine atom or a cyano group.

Each of the sulphonic acid and substituted or unsubstituted sulphamyl groups present in the phthalocyanine dyestuffs of Formula I is directly attached to a carbon atom which is in the 3- or 4-position of the benzene rings present in the phthalocyanine radical represented by Pc. The phthalocyanine radical Pc may be metal-free but preferably it is a stable metal-containing phthalocyanine radical such as a cobalt phthalocyanine or nickel phthalocyanine radical or above all, a copper phthalocyanine radical.

The invention comprises both pure compounds of Formula I and more usually, mixtures of such compounds. In the latter case, the apparent values of $a$, $b$ and $c$ can be fractional owing to the presence of species of different integral values for these symbols.

The phthalocyanine dyestuffs of Formula I can be obtained by condensing together in any suitable sequence as will lead to the desired product, the following intermediate compounds:

(a) A phthalocyanine compound of the formula:

$$Pc(SO_3H)_p(SO_2Cl)_q \qquad (II)$$

where Pc represents a phthalocyanine radical, $p$ has a value of 0 to 3 and $q$ has a value of 1 to 4, provided that $p$ and $q$ together do not exceed 4;

(b) Aromatic or aliphatic diamines or piperazine, corresponding to A and B in Formula I;

(c) Triazines or pyrimidines containing at least 2 halogen atoms corresponding to $Q^1$ and $Q^2$ in Formula I;

(d) An amine of the formula $NHR^3$—Z—W—V—Y where V, W, Y, Z, and $R^3$ have the meanings stated above; and where necessary, (e) A hydroxyl or mercapto compound, ammonia or an amine whereby a suitable substituent can be introduced into the remaining 2, 4 or 6 position of the triazine or pyrimidine ring represented by $Q^1$ and $Q^2$; and (f) An amine of the formula $NHR^1R^2$.

For example, one can start with a phthalocyanine compound (a) and introduce the various radicals represented A, $Q^1$, B, $Q^2$ and $NR^3$—Z—W—V—Y by successive reaction with products of the types (b), (c), (b), (c), and (d). Alternatively these five products can be first condensed together to give an intermediate compound of the formula: H—A—$Q^1$—B—$Q^2$—$NR^3$—Z—W—V—Y which is then condensed with the phthalocyanine Compound (a); other sequences are possible e.g. the preformation of H—A—$Q^1$—(halogen), H—B—$Q^2$—(halogen) and the condensation of these products with the phthalocyanine Compound (a) and the amine (d) in various sequences.

The various compounds listed under (e) are used to introduce the appropriate group in a 2, 4 or 6 position of a triazine or pyrimidine nucleus represented by $Q^1$ or $Q^2$ and the appropriate condensation stage will depend on the particular sequence to build up the dyestuff. The amines listed under (f) are used to convert a sulphonchloride group in the phthalocyanine nucleus to a sulphamyl group and can conveniently be added to the stage at which the reaction between the phthalocyanine Compound (a) and the diamine A (or a condensation product of A and the other reactants) is being effected.

The phthalocyanine compounds of Formula II can be obtained by treating the corresponding phthalocyanine or phthalocyanine sulphonic acid with chlorosulphonic acid, if desired in the presence of carbon tetrachloride or an acid halide such as thionyl chloride, sulphuryl chloride, phosphorus pentachloride, phosphorus oxychloride and phosphorus trichloride, for example as described in British specifications Nos. 708,543, 784,843 and 875,629 and in United States specification No. 2,219,330.

As examples of diamines of the types listed under (b) there can be mentioned: piperazine, ethylene diamine, m- and p-phenylene diamine, 4-sulpho-1,3-phenylene diamine, 3-sulpho-1,4-phenylene diamine, 1,3-diaminopropane, 4-amino-2-sulpho-N-methylaniline, 3- and 4-amino-N-methylaniline, 4-amino-N-β-hydroxy ethylaniline, N-(β-hydroxy ethyl)ethylene diamine and 4-chloro-1,3-phenylenediamine.

As examples of s-triazines or pyrimidines of the kinds listed under (c) there can be mentioned: cyanuric chloride, cyanuric bromide, 2-methoxy-4,6-dichloro-s-triazine, 2,4,5,6-tetracholoro-pyrimidine and 5 - cyano-2,4,6-trichloropyrimidine.

As examples of the amines of Type (d) there can be mentioned 3- or 4-aminobenzene sulphon-N-(β-chloroethylamide), 3- or 4-aminobenzene sulphon-N-(β-bromoethylamide), 3- or 4-aminobenzine sulphon-N-(γ-chloro-β-hydroxypropyl)amide, 3- or 4-aminobenzene sulphon-N-(β:γ-dichloropropyl)amide, 3- or 4-aminobenzene carbon-N-(β-chloroethyl)amide, 3- or 4-aminobenzene carbon-N-(β-bromoethyl)amide, 3- or 4-(β-chloroethoxy)aniline, 3- or 4-(β-bromoethoxy)-aniline, 3- or 4-(β-chloroethylthio)aniline, 3-sulpho-4-aminobenzene sulphon-N-(β-chloroethyl)amide, 4-sulpho-3-aminobenzene sulphon-N-β-chloroethyl)amide, 3- or 4-(γ-chloro-β-hydroxypropoxy)aniline, 3- or 4-aminobenzene sulphon-N-(β-chloropropyl)amide and 4-amino-ω-chloacetophenone.

As examples of the compounds listed under (e) there can be mentioned:

*For introduction of a group capable of reacting with hydroxyl groups of cellulose.*—Alkali metal sulphites, potassium thiocyanate, alkali metal salts of mercapto heterocyclic compounds, e.g. 2-mercaptobenzthiazole, 2-mercaptobenzselenazole, 2- mercaptobenzoxazole, 2-mercaptobenziminazole, 2-mercaptopyridine, 2-mercapto-6-methoxybenzthiazole, 2-mercapto-6-acetylaminobenzthiazole and 2 - mercapto - 6 - sulphobenzthiazole; tertiary amines, e.g. pyridine, trimethylamine and 1,4-diaza-2,2,2-bicyclooctane; alkali metal salts of substituted dithiocarbamates, e.g. sodium diethyldithiocarbamate, sodium dimethyldithiocarbamate, sodium diphenyldithiocarbamate and sodium pentamethylene dithiocarbamate; and thioamides, e.g. thioacetamide and thioacetanilide.

*For introduction of a group not capable of reacting with hydroxyl groups of cellulose.*—The main class of importance constitutes ammonia and primary and secondary amines, more especially aliphatic amines of low molecular weight, e.g. methyl-, ethyl-, n-propyl-, isopropyl-, β-hydroxyethyl- and n-butyl-amines, and the corresponding di-substituted amines, and anilines and napthylamines preferably carrying one or more sulphonic and/or carboxylic acid groups, e.g. orthanilic, metanilic and sulphanilic acids, aniline-2,4- and 2,5-disulphonic acids and 4- and 5-sulphoanthranilic acids.

As examples of amines of the class (f) there can be mentioned methylamine, ethylamine, dimethylamine, diethylamine, β - sulphoethylamine, N - (β-hydroxyethyl)amine, N,N-di(β-hydroxyethyl)amine and ammonia.

The various condensations mentioned above can, in general, be carried out in aqueous media at a temperature which may vary between 0° C. and the boil according to the reactants present. In most cases the addition of an acid-binding agent is advantageous to neutralise hydrogen halide liberated during the condensation. Suitable acid-binding agents include, for example, alkali-metal carbonates and bicarbonates, also an excess of aliphatic amine where one is being used as reactant.

The various intermediate products and final dyestuff can be isolated by the usual methods, e.g. by addition of salt and/or acid to cause precipitation followed by filtration and, if desired, drying.

The phthalocyanine dyestuffs of the invention either singly or in the form of mixtures with themselves or with other classes of reactive dyestuffs are valuable for colouring natural and artificial textile materials for example textile materials comprising cotton, viscose rayon, regenerated cellulose, wool, silk, cellulose acetate, polyamides, polyacrylonitrile, modified polyacrylonitrile and aromatic polyester fibres. For this purpose the dyestuffs can be applied to the textile materials by the usual dyeing, padding or printing methods recommended for reactive dyestuffs, e.g. by the methods described in U.K. specifications Nos. 797,946, 819,585, 820,470 and 846,505. By the use of steaming or baking treatments at temperatures of 100 to 150° C. for periods of 30 seconds to 10 minutes, the textile materials can be coloured in heavy depths of shades possessing excellent fastness to light and to wet treatments such as washing.

The phthalocyanine dyestuffs are particularly valuable because of the unusually high proportion of dyestuff which fixes on the cellulose textile material.

The invention is illustrated but not limited by the following examples in which parts and percentages are by weight:

*Example 1*

A mixture of 57.6 parts of copper phthalocyanine and 330 parts of chlorosulphonic acid is stirred for 3 hours at 135–140° C. The mixture is cooled to 80° C. 50 parts of thionyl chloride are added and the mixture is stirred for 2 hours at 85–90° C. The mixture is cooled to 20° C. and poured on to ice and the precipitated sulphonchloride is filtered off and washed with 500 parts of water.

A mixture of the phthalocyanine sulphonchloride obtained and 1000 parts of water is stirred at 15–20° C. and 25 parts of 7% ammonium hydroxide solution are added. When the pH of the mixture has returned to 7, 50 parts of 4% sodium hydroxide solution are added. When the pH of the mixture has returned to 7 again, a further 50 parts of 4% sodium hydroxide solution are added. When the pH of the mixture has returned to 7, 53 parts of the sodium salt of 1:3-phenylenediamine-4-sulphonic acid are added, followed by 33.6 parts of sodium bicarbonate. After stirring for 18 hours at room temperature, the mixture is kept at 40–5° for 4 hours. 20 parts of pyridine are added and stirring is continued for 1 hour. The product is precipitated by the addition of concentrated hydrochloric acid solution, filtered off, washed with 10% aqueous hydrochloric acid and dried at 80° C.

13.4 parts of the mixture of copper phthalocyanine-3-sulphon-N-(3'-amino-4'-sulphophenyl)amide-3 - sulphonamide sulphonic acid so obtained are dissolved in 200 parts of water by stirring and adding 4% sodium hydroxide solution until the pH of the solution is 7. At 5° C. a solution of 2.3 parts of cyanuric chloride in 20 parts of acetone is added. The pH of the mixture is maintained at 6–7 by the addition of 4% sodium hydroxide solution until reaction is complete. Then 2.7 parts of the sodium salt of 1:3-phenylenediamine-4-sulphonic acid are added and the temperature of the mixture is raised to 35–40° C. and the pH of the mixture is maintained at 6.5–7.0 by the addition of 4% sodium hydroxide solution until the reaction is finished. The mixture is cooled to 5° C. and a solution of 2.3 parts of cyanuric chloride in 20 parts of acetone is added. The pH of the mixture is maintained at 6–7 by the addition of 4% sodium hydroxide solution until reaction is finished. Then 3.4 parts of m-aminobenzene-sulphon-N-β-chloroethylamide hydrochloride are added. The temperature of the mixture is raised to 40° C. and the pH of the mixture is maintained at 6–7 by the addition of 4% sodium hydroxide until the reaction is finished. The dyestuff is precipitated by the addition of salt, filtered off and dried.

*Example 2*

A mixture of 28.8 parts of copper phthalocyanine and 135 parts of chlorosulphonic acid is stirred for 3 hours at 135–140° C. The mixture is cooled to 80° C. 25 parts of thionyl chloride are added and the mixture is stirred for 2 hours at 85–90° C. The mixture is cooled to 20° C. and poured on to ice and the precipitated sulphonchloride is filtered off and washed with 500 parts of water.

A mixture of the sulphonchloride so obtained, 42 parts of the sodium salt of 1,4-phenylenediamine-2-sulphonic acid, 33.6 parts of sodium bicarbonate, and 1000 parts of water is stirred for 18 hours. 20 parts of pyridine are added and stirring is continued for 1 hour. The product is precipitated by the addition of concentrated hydrochloric acid solution, filtered off, washed with 10% aqueous hydrochloric acid and dried at 80° C.

11.8 parts of the above mixture of copper phthalocyanine - 3 - sulphon-N-(4'-amino-3'-sulphophenyl)amide sulphonic acids are dissolved in 400 parts of water by stirring and adding 4% sodium hydroxide solution until the pH of the solution is 7. At 5° C. a solution of 3.7 parts of cyanuric chloride in 20 parts of acetone is added. The pH of the mixture is maintained at 6–7 by the addition of 4% sodium hydroxide solution until the reaction is finished. Then 4.2 parts of the sodium salt of 1,4-phenylenediamine-2-sulphonic acid are added. The temperature of the mixture is raised to 40° C. and the pH of the mixture is kept at 7 by the addition of 4% sodium hydroxide solution until the reaction is finished. The mixture is cooled to 5° C. and a solution of 3.7 parts of cyanuric chloride in 20 parts of acetone is added. The pH of the mixture is kept at 6–7 by the addition of 4% sodium hydroxide solution until the reaction is finished. 4.9 parts of m-aminobenzene sulphon-N-(β-chlorethyl)amide are added. The temperature of the mixture is raised to 40° C. and the pH of the mixture is maintained at 6–7 by the addition of 4% sodium hydroxide solution until the reaction is finished. The dyestuff is precipitated by the addition of salt, filtered off and dried.

*Example 3*

A mixture of 57.6 parts of copper phthalocyanine and 330 parts of chlorosulphonic acid is stirred for 3 hours at 135–140° C. The mixture is cooled to 80° C. 50 parts of thionyl chloride are added and the mixture is stirred for 2 hours at 85–90° C. The mixture is cooled to 20° C. and poured on to ice and the precipitated sulphonchloride is filtered off and washed with 500 parts of water.

A mixture of the sulphonchloride so obtained, 84 parts of the sodium salt of 1:3-phenylenediamine-4-sulphonic acid, 67.2 parts of sodium bicarbonate and 1000 parts of water is stirred for 18 hours at room temperature, then for 6 hours at 40–5° C. 20 parts of pyridine are added and stirring is continued for 1 hour. The product is precipitated by the addition of concentrated hydrochloric acid solution, filtered off, washed with 10% aqueous hydrochloric acid and dried at 80° C.

14.8 parts of the above mixture of copper phthalocyanine - 3 - sulphon - N - (3' - amino - 4' - sulphophenyl)amide sulphonic acid are dissolved in 400 parts of water by stirring and adding 4% hydroxide solution until the pH of the solution is 7. At 5° C., a solution of 4.0 parts of cyanuric chloride in 40 parts of acetone is added. The pH of the mixture is maintained at 6.7 by the addition of 4% sodium hydroxide until the reaction is finished. Then a solution of 4.1 parts of piperazine hexahydrate in 30 parts of water is added so that the pH of the solution keeps at 7–7.5. The temperature of the mixture is raised to 10–15° C. during the addition. Then at 5° C. a solution of 4.0 parts of cyanuric chloride in 40 parts of acetone is added. The pH of the mixture is kept at 6–7 by the addition of 4% sodium hydroxide solution until the reaction is finished. 5.8 parts of m - aminobenzenesulphon - N - β - chloroethylamide hydrochloride are added. The temperature of the mixture is raised to 40° C. and the pH of the mixture is maintained at 6–7 by the addition of 4% sodium hydroxide solution until the reaction is finished. The dyestuff is precipitated by the addition of salt, filtered off and dried.

*Example 4*

This is a typical recipe for application of the new dyestuff to cotton fabric.

A print paste is made up by mixing together:

| | Parts |
|---|---|
| Dye | 2 |
| Urea | 20 |
| Water | 40.5 |
| 4% aqueous sodium alginate solution | 35 |
| Sodium m-nitrobenzene sulphonate | 1 |
| Anhydrous sodium carbonate | 1.5 |
| Total | 100 |

The print paste is applied by roller print to an unmercerised cotton fabric, and is dried for 5 minutes at 60° C. The printed fabric is then subjected to a dry-heat treatment at 150° C. for 5 minutes. A turquoise print is obtained, which gives very little staining on adjacent white materials in a water test even when tested without any soaping treatment.

Table 1 below relates to further dyestuffs of the invention obtained by substituting the substance stated in the second column for the 25 parts of 7% ammonium hydroxide solution used in the procedure described in Example 1.

TABLE 1

Example:
5—31 parts of a 10% solution of CH$_3$.NH$_2$ in water
6—6.1 parts of HO.CH$_2$.CH$_2$.NH$_2$
7—45 parts of a 10% solution of (CH$_3$)$_2$NH in water
8—14.7 parts of the sodium salt of taurine Table 2 below relates to further dyestuffs of the invention obtained by substituting the substance stated in the second column for the m-aminobenzene-sulphon-N-β-chloroethylamide hydrochloride used in the procedure described in Example 1.

TABLE 2

Example:
9—3.0 parts of p-aminobenzene-sulphon-N-β-chloroethylamide
10—2.6 parts of p-(γ-chloro-β-hydroxypropoxy) aniline Table 3 below relates to further dyestuffs of the invention obtained by substituting the substance stated in the second column for the m-aminobenzene sulphon-N-(β-chloroethyl)amide used in the procedure described in Example 2.

TABLE 3

Example:
- 11—4.9 parts of p-aminobenzene-sulphon - N - (β-chlorethyl)amide
- 12—4.1 parts of p-(γ-chloro-β-hydroxypropoxy)aniline
- 13—6.4 parts of the sodium salt of p-aminobenzene-sulphon-N-(β-sulphatoethyl)amide
- 14—5.0 parts of p-aminobenzene-sulphon-N-(β-chloropropyl)amide
- 15—5.7 parts of m-aminobenzene-carbon-N-(β-sulphatoethyl)amide
- 16—4.4 parts of p-(β-bromoethoxy)aniline
- 17—3.4 parts of p-amino-ω-chloracetophenone
- 18—5.7 parts of p-aminobenzene-sulphon-N-(β:γ-dichloropropyl)amide
- 19—5.6 parts of p-aminobenzene-sulphon - N - (β-chlorethoxyethyl)amide Table 4 below relates to further dyestuffs of the invention obtained by substituting the substance stated in the second column for the cyanuric chloride (second addition) used in the procedure described in Example 2.

TABLE 4

Example:
- 20—3.6 parts of 2,4-dichloro-6-methoxy-s-triazine
- 21—4.2 parts of 5-cyano-2,4,6-trichloropyrimidine

*Example 22*

11.8 parts of the mixture of copper phthalocyanine-3-sulphon - N - (4' - amino - 3' - sulphophenyl)amide sulphonic acids, prepared as described in Example 2, are dissolved in 400 parts of water by stirring and adding 4% sodium hydroxide solution until the pH of the solution is 7. At 5° C. 3.7 parts of cyanuric chloride are added. The pH of the mixture is maintained at 6–7 by the addition of 4% sodium hydroxide solution until the reaction is finished. Then 4.2 parts of the sodium salt of 1:4-phenylenediamine-2-sulphonic acid are added. The temperature of the mixture is raised to 40° C., and the pH of the mixture is kept at 7 by the addition of 4% sodium hydroxide solution until the reaction is finished. The mixture is cooled to 5° C. and 3.7 parts of cyanuric chloride are added. The pH of the mixture is kept at 6–7 by the addition of 4% sodium hydroxide solution until the reaction is finished. Then 10.1 parts of sodium sulphite 7.H$_2$O crystals are added. The mixture is stirred at room temperature for 2 hours, then at 25° C. for 1 hour and finally at 30° C. for 1 hour. 4.9 parts of m-aminobenzene sulphon-N-(β-chlorethyl)amide are added. The temperature of the mixture is raised to 35° C. and the pH of the mixture is kept at 6 by the addition of 4% sodium hydroxide solution until the reaction is finished. The dyestuff is precipitated by the addition of salt, filtered off and dried.

Table 5 below relates to further examples of the invention obtained by substituting the substance described in the second column for the piperazine hexahydrate used in the procedure described in Example 3.

TABLE 5

Example:
- 23—1.3 parts of ethylene diamine
- 24—2.2 parts of N-(β-hydroxyethyl)ethylene diamine.

What we claim is:
A phthalocyanine dyestuff of the formula:

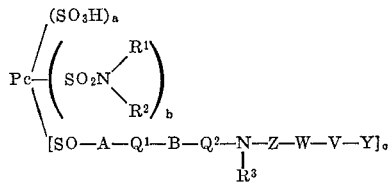

wherein Pc represents a copper phthalocyanine radical
R$^1$ and R$^3$ each represents a hydrogen atom, a lower alkyl radical or hydroxy lower alkyl radical;
R$^2$ represents a hydrogen atom, a lower alkyl radical, hydroxy-lower alkyl radical, or sulphoethyl radical;
Q$^1$ represents a s-triazile nucleus which carries a chlorine atom in one of the 2, 4 or 6 positions of the nucleus;
Q$^2$ represents a s-triazine nucleus which carries a chlorine atom, a methovyl group or a sulphonic acid group in one of the 2, 4 or 6 positions of the nucleus, or a pyrimidine nucleus which carries a cyano group in the 5-position and a chlorine atom in one of the 2, 4 or 6 positions of the nucleus;
A represents a phenylenediamine sulphonic acid radical connected by its nitrogen atoms to the SO$_2$ group and to a carbon atom in one of the remaining 2, 4 or 6 positions of Q$^1$;
B represents a phenylenediamine sulphonic acid, piperazine, ethylenediamine or N-(β-hydroxyethyl)-ethylenediamine radical connected by its nitrogen atoms to a carbon atom in one of the remaining 2, 4 or positions of Q$^1$ and Q$^2$;
Z represents a m- or p-phenylene radical;
W represents —SO$_2$NH—, —CO—, —CONH—, —O— or —S—;
V represents a —CH$_2$—, —CH$_2$CH$_2$—, $$-CH_2\overset{CH_3}{\underset{|}{C}H}-, \quad -CH_2\overset{CH_2Cl}{\underset{|}{C}H}-, \quad -CH_2\overset{OH}{\underset{|}{C}H_2}-$$

or —CH$_2$CH$_2$OCH$_2$CH$_2$— radical;
Y represents a chlorine atom, a bromine atom or a —OSO$_3$H group;
*a* represents a value of from 1 to 3; and
*b* represents a value of from 0 to 2 and *c* represents a value of from 1 to 3, provided that the sum of *a*, *b* and *c* does not exceed 4.

References Cited

UNITED STATES PATENTS

| | | | |
|---|---|---|---|
| 3,096,340 | 7/1963 | Tartter et al. | 260—314.5 |
| 3,133,059 | 5/1964 | Clark et al. | 260—242 |
| 3,210,345 | 10/1965 | Gamlen et al. | 260—242 |
| 3,232,931 | 2/1966 | Rothman | 260—314.5 X |

WALTER A. MODANCE, *Primary Examiner.*

JOHN M. FORD, *Assistant Examiner.*